(12) United States Patent
Gardner et al.

(10) Patent No.: US 10,800,166 B2
(45) Date of Patent: Oct. 13, 2020

(54) ON-DIE ACTUATOR FAILURE DETECTION

(71) Applicant: HEWLETT-PACKARD DEVELOPMENT COMPANY, L.P., Spring, TX (US)

(72) Inventors: James Michael Gardner, Corvallis, OR (US); Daryl E Anderson, Corvallis, OR (US); Eric Martin, Corvallis, OR (US)

(73) Assignee: Hewlett-Packard Development Comany, L.P., Spring, TX (US)

( * ) Notice: Subject to any disclaimer, the term of this patent is extended or adjusted under 35 U.S.C. 154(b) by 0 days.

(21) Appl. No.: 16/483,497

(22) PCT Filed: Apr. 5, 2017

(86) PCT No.: PCT/US2017/026132
§ 371 (c)(1),
(2) Date: Aug. 5, 2019

(87) PCT Pub. No.: WO2018/186852
PCT Pub. Date: Oct. 11, 2018

(65) Prior Publication Data
US 2020/0189265 A1    Jun. 18, 2020

(51) Int. Cl.
*B41J 2/14* (2006.01)
*B41J 2/045* (2006.01)
*B41J 2/21* (2006.01)
*B29C 64/112* (2017.01)
(Continued)

(52) U.S. Cl.
CPC .......... *B41J 2/0451* (2013.01); *B29C 64/112* (2017.08); *B29C 64/214* (2017.08); *B33Y 30/00* (2014.12);
(Continued)

(58) Field of Classification Search
CPC .. B41J 2/04541; B41J 2/0451; B41J 2/14153; B41J 2/1648; B41J 2/165; B41J 2/16579;
(Continued)

(56) References Cited

U.S. PATENT DOCUMENTS 5,757,392 A * 5/1998 Zhang .................. B41J 2/04581
347/14
6,527,378 B2    3/2003 Rausch et al.
(Continued)

FOREIGN PATENT DOCUMENTS

EP    0805028    6/2003

OTHER PUBLICATIONS

O'Horo, M.P., Damage of Thermal Ink Jet Heaters by the Collapsing Vapor Bubble, Jul. 6, 1989. <http://proceedings.spiedigitallibrary.org/proceeding.aspx?articleid=1257447 >.

*Primary Examiner* — Anh T Vo
(74) *Attorney, Agent, or Firm* — Fabian VanCott

(57) ABSTRACT

In one example in accordance with the present disclosure, a fluid ejection die is described. The die includes a number of actuator sensors disposed on the fluid ejection die to sense a characteristic of a corresponding actuator and to alter an evaluation voltage based on a performance of the corresponding actuator. The die also includes an actuator evaluation device per primitive to detect a failed actuator based at least in part on a comparison of the altered evaluation voltage and at least one threshold voltage. The die also includes a number of disable device coupled to respective actuators and to disable failed actuators.

15 Claims, 5 Drawing Sheets

(51) Int. Cl.
    *B33Y 30/00*     (2015.01)
    *B29C 64/214*     (2017.01)
    *B41J 2/165*     (2006.01)
    *B41J 2/16*     (2006.01)
    *B41J 2/355*     (2006.01)

(52) U.S. Cl.
    CPC ....... *B41J 2/04541* (2013.01); *B41J 2/04586* (2013.01); *B41J 2/165* (2013.01); *B41J 2/1648* (2013.01); *B41J 2/16579* (2013.01); *B41J 2/2142* (2013.01); *B41J 2/355* (2013.01)

(58) Field of Classification Search
    CPC ................ B41J 2/2142; B41J 2/355; B41J 2002/14354; Y10T 29/49401
    See application file for complete search history.

(56) References Cited

U.S. PATENT DOCUMENTS

| | | | |
|---|---|---|---|
| 9,044,936 B2 | 1/2015 | Van Brocklin et al. | |
| 9,022,499 B2 | 5/2015 | Fujimoto et al. | |
| 9,283,750 B2 | 3/2016 | Liao et al. | |
| 9,493,002 B2 | 10/2016 | Edelen et al. | |
| 2006/0268046 A1* | 11/2006 | Ootsuka | B41J 2/04506 347/20 |
| 2008/0316277 A1 | 12/2008 | Edelen et al. | |
| 2011/0084997 A1 | 4/2011 | Chen et al. | |
| 2015/0097885 A1* | 4/2015 | Hosokawa | B41J 2/04581 347/10 |
| 2016/0167364 A1* | 6/2016 | Matsumoto | B41J 2/04551 347/9 |

* cited by examiner

ON-DIE ACTUATOR FAILURE DETECTION

BACKGROUND

A fluid ejection die is a component of a fluid ejection system that includes a number of nozzles. The dies can also include other actuators such as micro-recirculation pumps. Through these nozzles and pumps, fluid, such as ink and fusing agent among others, is ejected or moved. Over time, or due to a particular event, usage mode, wear-out, defect or environmental condition, these nozzles and actuators deteriorate. These and other scenarios may adversely affect operations of the device in which the die is installed.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1A:
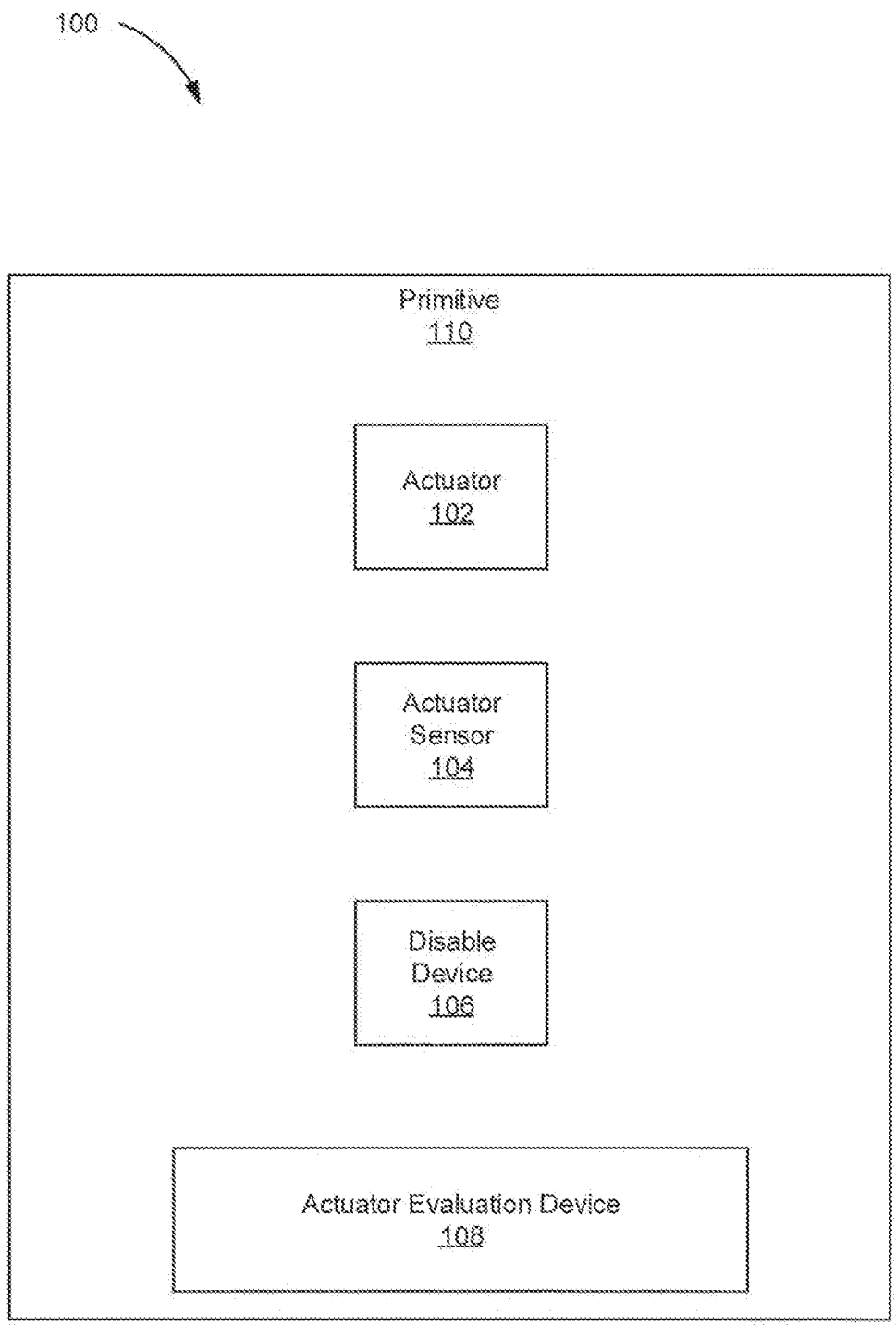
FIGS. 1A and B are block diagrams of a fluid ejection die including on-die actuator failure detection components, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A fluid ejection die is a component of a fluid ejection system that includes a number of actuators. These actuators may come in the form of nozzles that eject fluid from a die, or non-ejecting actuators, such as recirculation pumps that circulate fluid throughout the fluid channels on the die. Through these nozzles and pumps, fluid, such as ink and fusing agent among others, is ejected or moved.

Specific examples of devices that rely on fluid ejection systems include, but are not limited to, inkjet printers, multi-function printers (MFPs), and additive manufacturing apparatuses. The fluid ejection systems in these systems are widely used for precisely, and rapidly, dispensing small quantities of fluid. For example, in an additive manufacturing apparatus, the fluid ejection system dispenses fusing agents. The fusing agent is deposited on a build material, which fusing agent facilitates the hardening of build material to form a three-dimensional product.

Other fluid ejection systems dispense ink on a two-dimensional print medium such as paper. For example, during inkjet printing, ink is directed to a fluid ejection die. Depending on the content to be printed, the device in which the fluid ejection system is disposed, determines the time and position at which the ink drops are to be released/ejected onto the print medium. In this way, the fluid ejection die releases multiple ink drops over a predefined area to produce a representation of the image content to be printed. Besides paper, other forms of print media may also be used.

Accordingly, as has been described, the systems and methods described herein may be implemented in a two-dimensional printing operation, i.e., depositing fluid on a substrate, and in a three-dimensional printing, i.e., depositing a fusing agent on a material base to form a three-dimensional printed product.

To eject the fluid, these fluid ejection dies include nozzles and other actuators. Fluid is ejected from the die via nozzles and is moved throughout the die via other actuators, such as pumps, The fluid ejected through each nozzle comes from a corresponding fluid reservoir in fluid communication with the nozzle.

To eject the fluid, each nozzle includes various components. For example, a nozzle includes an ejector, an ejection chamber, and a nozzle orifice. An ejection chamber of the nozzle holds an amount of fluid. An ejector in the ejection chamber operates to ejected fluid out of the ejection chamber, through the nozzle orifice. The ejector may include a thermal resistor or other thermal device, a piezoelectric element, or other mechanism for ejecting fluid from the firing chamber.

While such fluid ejection systems and dies undoubtedly have advanced the field of precise fluid delivery, some conditions impact their effectiveness. For example, the nozzles on a die are subject to many cycles of heating, drive bubble formation, drive bubble collapse, and fluid replenishment from a fluid reservoir. Over time, and depending on other operating conditions, the nozzles may fail. As a specific example of failure, the ejector in an actuator such as a nozzle or recirculation pump may become damaged. A damaged ejector can have an impact on other operations of the device and may even initiate a cascading failure that causes adjacent ejectors to also fail.

Accordingly, the present specification describes a method to detect and accommodate for a failed actuator. Specifically, the present specification describes an identification of a particular ejector that has failed. A failure of the ejector may result in an electrical short between the ejector and the corresponding actuator sensor. The present specification describes a die that includes on-die components that indicate whether such a short has developed between the ejector and an actuator sensor and, if so, disables the relevant actuator. In some examples, in addition to disabling the actuator, the on-die components may activate another actuator in place of the failed actuator.

Specifically, the present specification describes a fluid ejection die. The fluid ejection die includes a number of actuator sensors disposed on the fluid ejection die. The actuator sensors sense a characteristic of a corresponding actuator and alter an evaluation voltage based on a performance of the corresponding actuator. The die also includes an actuator evaluation device per primitive to detect a failed actuator based at least in part on a comparison of the altered evaluation voltage and at least one threshold voltage. The fluid ejection die also includes a number of disable devices. Each disable device is coupled to a respective actuator and is to disable a failed actuator.

The present specification also describes a fluid ejection system that includes multiple fluid ejection dies. Each fluid ejection die includes a number of actuator sensors to 1) sense a characteristic of a corresponding actuator and 2) alter an evaluation voltage based on a detected short between the actuator sensor and the corresponding actuator. Each actuator sensor is coupled to a respective actuator and multiple coupled actuator sensors and actuators are grouped as primitives on the fluid ejection die. Each die also includes an actuator evaluation device per primitive to indicate a short between the actuator sensor and an actuator based at least in part on a comparison of the altered evaluation voltage and at least one threshold voltage. The fluid ejection dies also include a number of disable devices. Each disable device is coupled to a respective actuator and is to disable a corresponding actuator when a short between the actuator sensor and the actuator is detected.

The present specification also describes a method for detecting a failure of an actuator. According to the method, an activation pulse for an actuator of a primitive is received and the actuator is activated based on the activation pulse. An evaluation voltage is altered via an actuator sensor corresponding to the activated actuator. The evaluation voltage is altered 1) based on a performance of a corresponding actuator and 2) responsive to the activation of the corresponding actuator. A failure of the corresponding actuator is detected based at least in part on a comparison of the altered evaluation voltage against at least one threshold. The corresponding actuator is disabled when a comparison indicates the corresponding actuator has failed In this example, the actuator sensor, actuator, actuator evaluation device, and disable devices are disposed on the fluid ejection die itself as opposed to being off die, for example as a part of printer circuitry or other fluid ejection system circuitry. When such actuator evaluation circuitry is not on the fluid ejection die, gathered information from an actuator sensor is passed off die where it is used to determine a state of the corresponding actuator. Accordingly, by incorporating these elements directly on the fluid ejection die, increased technical functionality of a fluid ejection die is enabled. For example, printer-die communication bandwidth usage is reduced when sensor information is not passed off-die, but is rather maintained on the fluid ejection die when evaluating an actuator. On-die circuitry also reduces the computational overhead of the printer in which the fluid ejection die is disposed. Still further, having such actuator evaluation circuitry on the fluid ejection die itself removes the printer from managing actuator service and/or repair and localizes it to the die itself. Additionally, by not locating such sensing and evaluation circuitry off-die, but maintaining it on the fluid ejection die, there can be faster responses to malfunctioning actuators. Still further, positioning this circuitry on the fluid ejection die reduces the sensitivity of these components to electrical noise that could corrupt the signals if they were driven off the fluid ejection die.

In summary, using such a fluid ejection die 1) allows for actuator evaluation circuitry to be disposed on the die itself, as opposed to sending sensed signals to actuator evaluation circuitry off die; 2) increases the efficiency of bandwidth usage between the device and die; 3) reduces computation overhead for the device in which the fluid ejection die is disposed; 4) provides improved resolution times for malfunctioning actuators; 5) allows for actuator evaluation in one primitive while allowing continued operation of actuators in another primitive; and 6) places management of actuators on the fluid ejection die as opposed to on the printer in which the fluid ejection die is installed. However, it is contemplated that the devices disclosed herein may address other matters and deficiencies in a number of technical areas.

As used in the present specification and in the appended claims, the term "actuator" refers to a nozzle or another non-ejecting actuator. For example, a nozzle, which is an actuator, operates to eject fluid from the fluid ejection die. A recirculation pump, which is an example of a non-ejecting actuator, moves fluid throughout the fluid slots, channels, and pathways within the fluid ejection die.

Accordingly, as used in the present specification and in the appended claims, the term "nozzle" refers to an individual component of a fluid ejection die that dispenses fluid onto a surface. The nozzle includes at least an ejection chamber, an ejector, and a nozzle orifice.

Further, as used in the present specification and in the appended claims, the term "fluid ejection die" refers to a component of a fluid ejection device that includes a number of nozzles through which a printing fluid is ejected. Groups of actuators are categorized as "primitives" of the fluid ejection die. In one example, a primitive may include between 8-16 actuators. The fluid ejection die may be organized first into two columns with 30-150 primitives per column.

Even further, as used in the present specification and in the appended claims, the term "a number of" or similar language is meant to be understood broadly as any positive number including 1 to infinity.

Figure 1B:
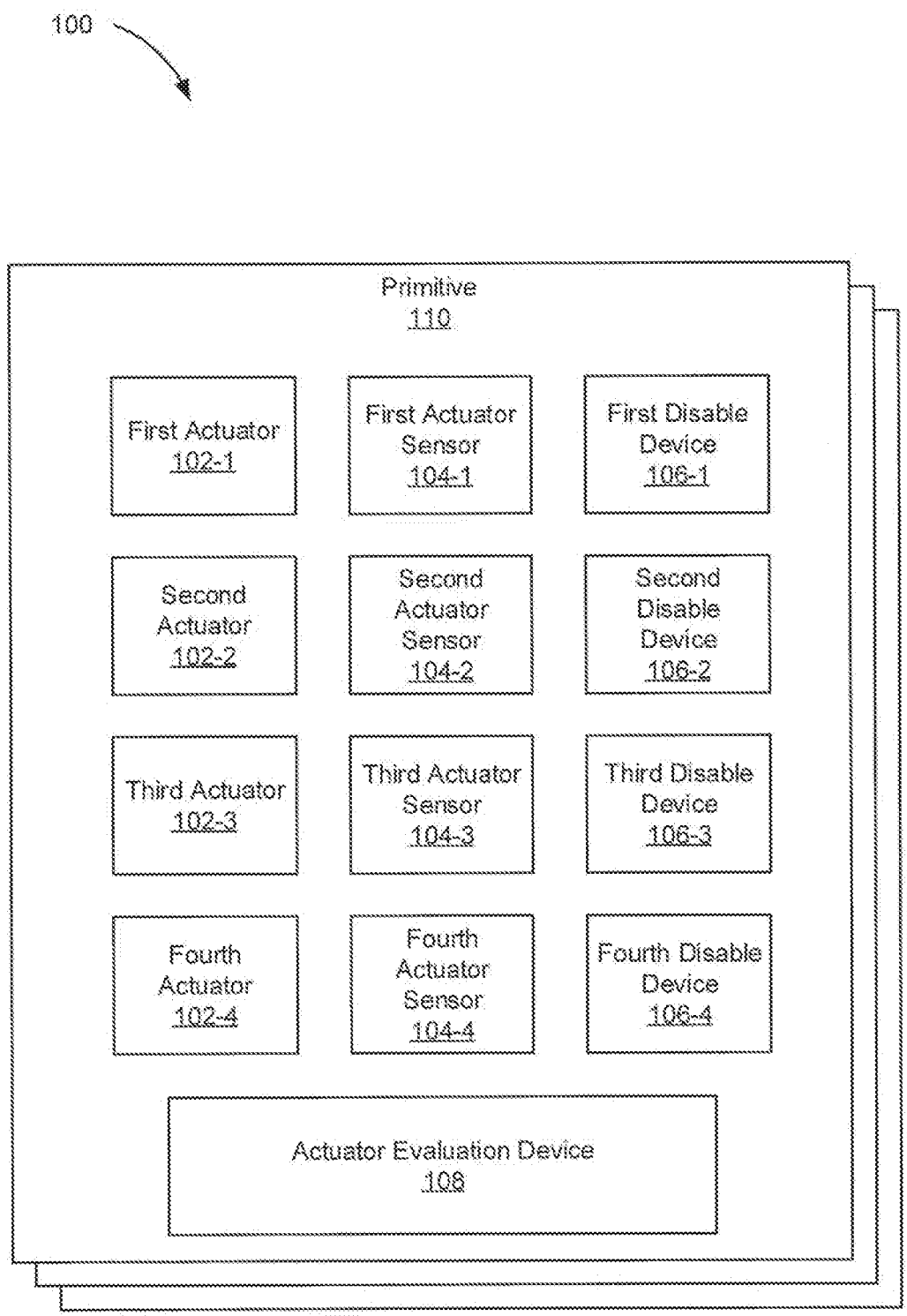

FIGS. 1A and 1B are block diagrams of a fluid ejection die (100) including on-die actuator failure components, according to an example of the principles described herein. As described above, the fluid ejection die (100) is a component of a fluid ejection system that houses components for ejecting fluid and/or transporting fluid along various pathways. The fluid that is ejected and moved throughout the fluid ejection die (100) can be of various types including ink, biochemical agents, and/or fusing agents.

FIG. 1A depicts a fluid ejection die (100) with an actuator (102), an actuator sensor (104), a disable device (106), and an actuator evaluation device (108) disposed on a primitive (110). FIG. 1B depicts a fluid ejection die (100) with multiple actuators (102), multiple actuator sensors (104), multiple disable devices (106), and an actuator evaluation device (108) disponed on each primitive (110).

The fluid ejection die (100) includes various actuators (102) to eject fluid from the fluid ejection die (100) or to otherwise move fluid throughout the fluid ejection die (100). In some cases there may be one actuator (102) per primitive (110) as depicted in FIG. 1A, in other examples there may be multiple actuators (102-1, 102-2, 102-3, 102-4) per primitive as depicted in FIG. 18B. The actuators (102) may be of varying types. For example, nozzles are one type of actuator (102) that operate to eject fluid from the fluid ejection die (100). Another type of actuator (102) is a recirculation pump that moves fluid between a nozzle channel and a fluid slot that feeds the nozzle channel. While the present specification may make reference to a particular type of actuator (102), the fluid ejection die (100) may include any number and type of actuators (102). Also, within the figures the indication "-*" refers to a specific instance of a component. For example, a first actuator is identified as (102-1). By comparison, the absence of an indication "-*" refers to the component in general. For example, an actuator in general is referred to as an actuator (102).

Returning to the actuators (102), a nozzle is a type of actuator (102) that ejects fluid originating in a fluid reservoir onto a surface such as paper or a build material volume. Specifically, the fluid ejected by the nozzles may be provided to the nozzle via a fluid feed slot in the fluid ejection die (100) that fluidically couples the nozzles to a fluid reservoir. In order to eject the fluid, each nozzle includes a number of components, including an ejector, an ejection chamber, and a nozzle orifice. An example of an ejector, ejection chamber, and a nozzle orifice are provided below in connection with FIG. 28.

The fluid ejection die (100) also includes actuator sensors (104) disposed on the fluid ejection die (100). In some cases there may be one actuator sensor (104) per primitive (110) as depicted in FIG. 1A, in other examples there may be multiple actuator sensors (104-1, 104-2, 104-3, 104-4) per primitive (110) as depicted in FIG. 1B. The actuator sensors (104) sense a characteristic of a corresponding actuator (102). For example, the actuator sensors (104) may measure an impedance near an actuator (102). As a specific example, the actuator sensors (104) may be drive bubble detectors that detect the presence of a drive bubble within an ejection chamber of a nozzle. In some examples, the actuator sensors (104) may be uniquely paired with actuators (102) as depicted in FIG. 1B. That is each ejector of an actuator (102) may have a unique plate disposed over it. In other examples, a single actuator sensor (104) may be shared by multiple actuators (102). For example, the actuator sensor (104) may be a single plate that covers multiple ejectors of multiple actuators (102).

The actuator sensors (104) also alter an evaluation voltage based on a performance of the corresponding actuator (102). For example, an evaluation voltage may constantly be passed to the actuator evaluation device (108). As the performance of a first actuator (102-1) drops, i.e., as there is a short generated between an ejector of the first actuator (102-1) and the corresponding first actuator sensor (104-1), this evaluation voltage is drawn either higher or lower. A change to the evaluation voltage greater than a threshold amount indicates the presence of a short between the ejector of the first actuator (102-1) and the corresponding first actuator sensor (104-1) and consequently, that the ejector of the first actuator (102-1) has failed.

As described above, in some examples such as that depicted in FIG. 1B, each actuator sensor (104) of the number of actuator sensors (104) may be coupled to a respective actuator (102) of the number of actuators (102). In one example, each actuator sensor (104) is uniquely paired with the respective actuator (102). For example, a first actuator (102-1) may be uniquely paired with a first actuator sensor (104-1). Similarly, the second actuator (102-2), third actuator (102-3), and fourth actuator (102-4) may be uniquely paired with the second actuator sensor (104-2), third actuator sensor (104-3), and fourth actuator sensor (104-4). Multiple pairings of actuators (102) and actuator sensors (104) may be grouped together in a primitive (110) of the fluid ejection die (100). That is the fluid ejection die (100) may include any number of actuator (102)/actuator sensor (104) pairs grouped as primitives (110). Pairing the actuators (102) and actuator sensors (104) in this fashion increases the efficiency of actuator (102) management. While FIG. 1B depicts multiple actuators (102) and actuator sensors (104), a primitive (110) may have any number of actuator (102)/actuator sensor (104) pairs, including one, as depicted in FIG. 1A.

Including the actuator sensors (104) on the fluid ejection die (100), as opposed to some off die location such as on the printer, also increases efficiency. Specifically, it allows for sensing to occur locally, rather than off-die, which increases the speed with which sensing can occur.

The fluid ejection die (100) also includes an actuator evaluation device (108) per primitive (110). The actuator evaluation device (108) detects a failed actuator (102) based at least on an output of the actuator sensor (104). For example, a first actuator sensor (104-1) may alter the evaluation voltage to a certain degree. The actuator evaluation device (108) may compare the altered evaluation voltage against at least one threshold voltage, and if the altered evaluation voltage is greater than the threshold voltage, may indicate that the ejector in the corresponding first actuator (102-1) has in fact failed. The threshold voltage delineates between an expected voltage for a properly operating ejector and a shorted ejector. As a specific example, a voltage lower than the threshold voltage may indicate that the ejector is operating as expected. A voltage higher than the threshold voltage may indicate that the ejector is not performing as expected, which has resulted in a short between the ejector and the associated actuator sensor (104).

As can be seen in FIGS. 1A and 18B, the actuator evaluation device (108) is per primitive (110). That is, a single actuator evaluation device (108) Interfaces with, and is uniquely paired with just those actuators (102), just those actuator sensors (104), and just those disable devices (108) of that particular primitive (110). Put yet another way, a single actuator evaluation device (108) is shared among all the actuators (102) in the primitive (110).

The fluid ejection die (100) also includes a number of disable devices (106). In some cases there may be one disable device (106) per primitive (110) as depicted in FIG. 1A, in other examples there may be multiple disable devices (106-1, 106-2, 106-3, 106-4) per primitive (110) as depicted in FIG. 1B. As with the number of actuator sensors (104), each of the disable devices (106) may be coupled to a respective actuator (102) of the number of actuators (102), and in some cases uniquely paired with actuators (102) of the number of actuators (102).

The disable devices (106) may disable the associated actuators (102) when an ejector of the associated actuator (102) has failed. Such a disabling can be done by preventing an activation pulse intended for the specific actuator (102) from reaching that actuator (102). For example, upon a determination by the actuator evaluation device (108) that an ejector of the first actuator (102-1) has failed resulting in a short between it and the associated actuator sensor (104-1), the associated first disable device (106-1) may prevent immediate and subsequent activation pulses from reaching the first actuator (102-1). In so doing, the adverse effects resulting from the continued operation of the first actuator (102-1) can be avoided. Specifically, if the comparison of the altered evaluation voltage is greater than a ceiling threshold, lower than a floor threshold, or outside of a range defined by the ceiling threshold and the floor threshold, the disable device (106) corresponding to a failed actuator (102) may prevent immediate and subsequent activation signals from passing to that failed actuator (102). In some examples, the detection and disablement of the actuator (102) with the failed ejector occurs during printing, i.e., the evaluation voltage is altered responsive to the activation of an actuator.

In some examples, the disable devices (106) are one-time write memory devices that permanently disable the corresponding actuator (102) upon a detection that an ejector of the corresponding actuator (102) has failed. In other examples, the number of disable devices (106) are resettable disable devices. Such resettable disable devices (106) may allow for subsequent testing of an ejector to determine if it has actually failed, or if a false positive has resulted. For example, upon the detection of a failed actuator (102), the disable device (106) may temporarily disable the actuator (102) so that if it has truly failed, it would not negatively impact printing or other actuators (102). Then, at a later point in time when appropriate, the actuator (102) can be more thoroughly tested to determine if it is truly failed.

The fluid ejection die (100) as described herein allows for the immediate detection of damaged ejectors. That is, in other systems, ejector failure detection may occur periodically in a "testing" period. Accordingly, an ejector that fails in between different testing periods may continue to operate notwithstanding its failed state. As described above, such operation in a failed state can cause the failure of other actuators (102), which further affects printing operations. Accordingly, using the output of an actuator sensor (104) during a firing event to determine ejector failure allows for immediate failure detection and immediate, and efficient, disablement of the failed actuator (102).

Figure 2A:
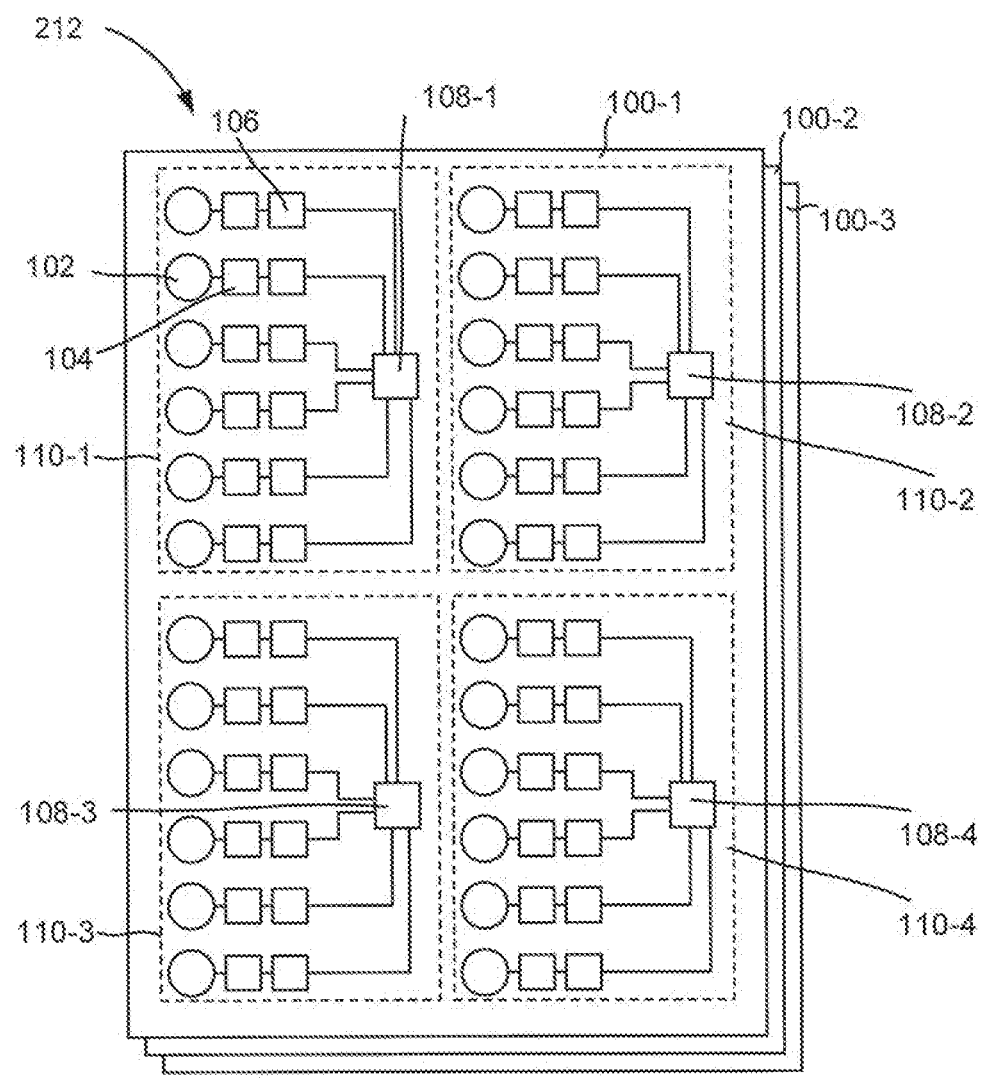
FIG. 2A is a block diagram of a fluid ejection system including on-die actuator failure detection components, according to an example of the principles described herein.

FIG. 2A is a block diagram of a fluid ejection system (212) including on-die actuator (FIG. 1A, 102) failure detection components, according to an example of the principles described herein. The system (212) includes multiple fluid ejection dies (100-1, 100-2, 100-3) on which multiple actuators (102) and corresponding actuator sensors (104) are disposed. For simplicity, a single instance of an actuator (102), an actuator sensor (104), and a disabling device (106) are indicated with reference numbers. However, a fluid ejection die (100) may include any number of actuators (102), actuator sensors (104), and disabling devices (106). In the example depicted in FIG. 2A, the actuators (102), actuator sensors (104), and disabling devices (106) are arranged into columns, however these components may be arranged in different arrays or other physical arrangement. The actuators (102), actuator sensors (104), and disabling devices (106) in each column may be grouped into primitives (110-1, 110-2, 110-3, 110-4). In the case of actuators (102) that are fluid ejection nozzles, one nozzle per primitive (110) is activated at a time. While FIG. 2A depicts six components per primitive (110), primitives (110) may have any number of these components.

Figure 2B:
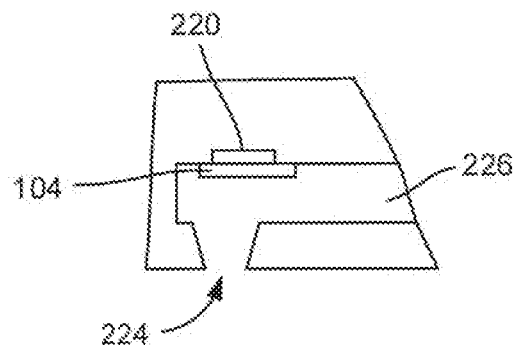
FIG. 2B is a cross-sectional diagram of a nozzle of the fluid ejection system depicted in FIG. 2A, according to an example of the principles described herein.

FIG. 2B is a cross sectional diagram of a nozzle (218). As described above, a nozzle (218) is an actuator (102) that operates to eject fluid from the fluid ejection die (100) which fluid is initially disposed in a fluid reservoir that is fluidically coupled to the fluid ejection die (100). To eject the fluid, the nozzle (218) includes various components. Specifically, a nozzle (218) includes an ejector (220), an ejection chamber (226), and a nozzle orifice (224). The nozzle orifice (224) may allow fluid, such as ink, to be deposited onto a surface, such as a print medium. The ejection chamber (226) may hold an amount of fluid, The ejector (220) may be a mechanism for ejecting fluid from the ejection chamber (226) through the nozzle orifice (224), where the ejector (220) may include a firing resistor or other thermal device, a piezoelectric element, or other mechanism for ejecting fluid from the ejection chamber (226).

In the case of a thermal inkjet operation, the ejector (220) is a heating element. Upon receiving the firing signal, the heating element initiates heating of the ink the ejection chamber (226). As the temperature of the fluid in proximity to the heating element increases, the fluid may vaporize and form a drive bubble. As the heating continues, the drive bubble expands and forces the fluid out of the nozzle orifice (224). As the vaporized fluid bubble collapses, a negative pressure within the ejection chamber (226) draws fluid into the ejection chamber (226) from the fluid supply, and the process repeats. This system is referred to as a thermal inkjet system.

FIG. 2B also depicts an actuator sensor (104). Accordingly, as described above, the actuator sensors (104) can be uniquely paired with an actuator (102) or may be shared among multiple actuators (102). In one specific example, the actuator sensor (104) is a drive bubble detection device, which can, based on impedance measurements, determine whether a drive bubble has formed or not.

The actuator sensor (104) may include a single electrically conductive plate, such as a tantalum plate, which can detect a short between the ejector (220). As indicated in FIG. 2B, the ejector (220) and the actuator sensor (104) may be in close proximity to one another. As an ejector (220) fails, a short may develop between the ejector (220) and the actuator sensor (104). Such a short may drive up a voltage output by the actuator sensor (104) during its operation. Accordingly, a detection of this increase in voltage can allow for the identification of a faulty or failed ejector (220). Specifically, an output of the actuator sensor (104) is tied to an evaluation voltage. The increase in an output of the actuator sensor (104) resulting from a short between the ejector (220) and the actuator sensor (104) increases the output, which thereby increases the evaluation voltage. If the change to the evaluation voltage is greater than a threshold amount, then it can be ascertained that the associated ejector (220) has failed. Similarly, a decrease in an output of the actuator sensor (104) can indicate a short between the ejector (220) and ground. Doing so would decrease the output of the actuator sensor (104) which decreases the evaluation voltage. Accordingly, as described above, if the change to the evaluation voltage is greater than a threshold amount, but in the opposite direction, then it can be ascertained that the associated ejector (220) has failed.

Returning to FIG. 2A, the system (212) also includes a number of actuator evaluation devices (108-1, 108-2, 108-3, 108-4). Specifically, the system (212) includes an actuator evaluation device (108) per primitive. That is, each of the actuator evaluation devices (108-1, 108-2, 108-3, 108-4) may be uniquely paired with a corresponding primitive (110-1, 110-2, 110-3, 110-4). That is a first primitive (110-1) may be uniquely paired with a first actuator evaluation device (108-1). Similarly, a second primitive (110-2), third primitive (110-3), and a fourth primitive (110-4) may be uniquely paired with a second actuator evaluation device (108-2), third actuator evaluation device (108-3), and fourth actuator evaluation device (108-4), respectively. In one example, each actuator evaluation device (108) corresponds to just the number of actuators (102) and just the number of actuator sensors (104) within that particular primitive (110).

The actuator evaluation devices (108) detect a failed ejector (220) of any actuator (102) within the primitive (110). That is, the actuator evaluation devices (108) can detect a short between a failed ejector (220) and a corresponding actuator sensor (104), which short indicates a failed ejector (220). This is done by comparing an evaluation voltage, which has been altered as a result of the short between the ejector (220) and the corresponding actuator sensor (104), against at least one threshold voltage, and in some cases against at least two threshold voltages. For example, a threshold voltage may be ceiling voltage where any voltage greater than this indicates a failed ejector (220). In another example, the threshold voltage may be a floor voltage where any voltage less than this indicates a failed ejector (220). In some cases, the actuator evaluation device (108) may compare the altered evaluation voltage against both a ceiling and a floor voltage. Accordingly, per this comparison of the threshold voltage and the altered evaluation voltage, it can be determined whether an ejector (220) has failed.

Including the actuator evaluation device (108) on the fluid ejection die (100) improves the efficiency of actuator evaluation. For example, in other systems, any sensing information collected by an actuator sensor (104) is not per actuator (102), nor is it assessed on the fluid ejection die (100), but is rather routed off the fluid ejection die (100) to a printer, which increases communication bandwidth between the fluid ejection die (100) and the printer in which it is installed. Moreover such primitive/actuator evaluation device pairing allows for the localized "in primitive" assessment which can be used locally to disable a particular actuator (102), without involving the printer or the rest of the fluid ejection die (100). Moreover, the actuator evaluation device (108) as described herein allows for immediate remedial action to be executed, rather than waiting for ejector (220) detection and disablement to occur during some periodic and predefined testing period.

Including an actuator evaluation device (108) per primitive (214) increases the efficiency of ejector (220) evaluation. For example, were the actuator evaluation device (108) to be located off die, while one actuator (102) is being tested, all the actuators (102) on the die (100), not just those in the same primitive (110), would be deactivated so as to not interfere with the testing procedure. However, where testing is done at a primitive (110) level, other primitives (110) of actuators (102) can continue to function to eject or move fluid. That is, an actuator (102) corresponding to the first primitive (110-1) may be evaluated while actuators (102) corresponding to the second primitive, (110-2), the third primitive (110-3), and the fourth primitive (110-4) may continue to operate to deposit fluid to form printed marks. Moreover, including an actuator evaluation device (108) per primitive (110) as opposed to per actuator (102) saves space, and is more efficient at determining actuator performance.

FIG. 2A also depicts the disable devices (106) that may be uniquely paired with corresponding actuators (102) and actuator sensors (104) to disable an actuator (102) whose ejectors (220) has been determined by the actuator evaluation device (108) for that primitive (110) to have failed.

Figure 3:
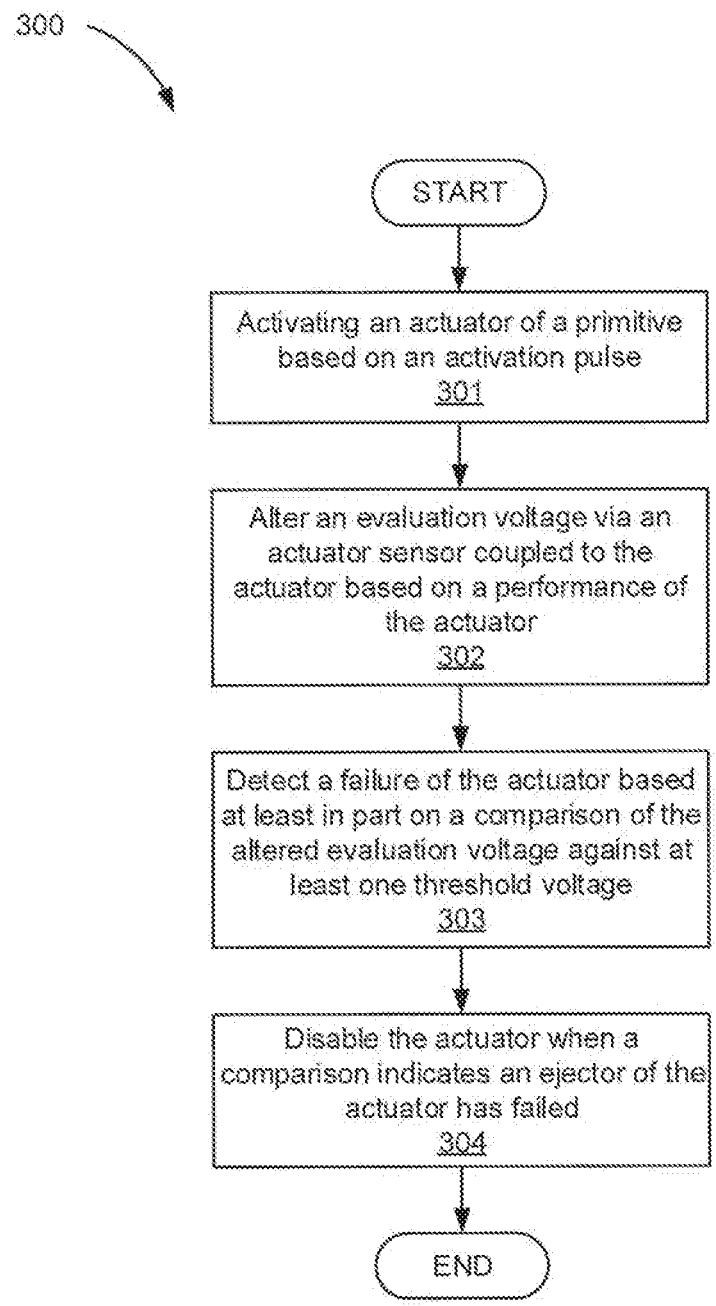
FIG. 3 is a flowchart of a method for performing on-die actuator failure detection, according to an example of the principles described herein.

FIG. 3 is a flowchart of a method (300) for performing on-die actuator (FIG. 1A, 102) failure detection, according to an example of the principles described herein. According to the method (300), an actuator (FIG. 1A, 102) of a primitive (FIG. 1A, 110) is activated (block 301) based on an activation pulse. That is, a controller, or other off-die or on-die device, sends an electrical impulse that initiates an activation event. For a non-ejecting actuator, such as a recirculation pump, the activation pulse may activate a component to move fluid throughout the fluid channels and fluid slots within the fluid ejection die (FIG. 1A, 100). In a nozzle, (FIG. 2B, 218), the activation pulse may be a firing pulse that causes the ejector (FIG. 2B, 220) to eject fluid from the ejection chamber (FIG. 2B, 226).

In the specific example of a nozzle, the activation pulse may include a pre-charge pulse that primes the ejector (FIG. 2B, 220). For example, in the case of a thermal ejector, the pre-charge may warm up the heating element such that the fluid inside the ejection chamber, (FIG. 2B, 226) is heated to a near-vaporization temperature. After a slight delay, a firing pulse is passed, which heats the heating element further so as to vaporize a portion of the fluid inside the ejection chamber, (FIG. 2B, 226). Activating (block 301) the actuator (FIG. 1A, 102) based on the activation pulse at an actuator (FIG. 1A, 102) to be actuated may include directing a global activation pulse to a particular actuator (FIG. 1A, 102). That is, the fluid ejection die (FIG. 1A, 100) may include an actuator select component that allows the global activation pulse to be passed to a particular actuator for activation. The actuator (FIG. 1A, 102) that is selected is part of a primitive (FIG. 2A, 110). It may be the case, that one actuator (FIG. 1A, 102) per primitive (FIG. 2A, 110) may be activated at any given time.

Accordingly, the selected actuator (FIG. 1A, 102) is activated based on the activation pulse. For example, in thermal inkjet printing, the heating element in a thermal ejector (FIG. 2B, 220) is heated so as to generate a drive bubble. The activation of a particular actuator (FIG. 1A, 102) generates a first voltage output by the corresponding actuator sensor (FIG. 1A, 104), that is unique to that actuator (FIG. 1A, 102). That is, each actuator sensor (FIG. 1A, 104) is coupled to, and in some cases, uniquely paired with, an actuator (FIG. 1A, 102). Accordingly, the actuator sensor (FIG. 1A, 104) that is uniquely paired with the actuator (FIG. 1A, 102) that has been fired outputs a first voltage.

To generate the first voltage, a current is passed to an electrically conductive plate of the actuator sensor (FIG. 1A, 104), and from the plate into the fluid or fluid vapor. For example, the actuator sensor (FIG. 1A, 104) may include a single conductive plate disposed between the ejector (FIG. 2B, 220) and the ejection chamber, (FIG. 2B, 226).

In some examples, activating (block 301) the actuator (FIG. 1A, 102) to obtain a first voltage for ejector (FIG. 2B, 220) evaluation may be carried out during the course of forming a printed mark. That is, the firing event that triggers an actuator evaluation may be a firing event to deposit fluid on a portion of the media intended to receive fluid. In other words, there is no dedicated operation relied on for performing activator evaluation, and there would be no relics of the activator evaluation process as the ink is deposited on a portion of an image that was intended to receive fluid as part of the printing operation.

In another example, the actuator (FIG. 1A, 102) is activated in a dedicated event independent of a formation of a printed mark. That is, the event that triggers an actuator evaluation may be in addition to a firing event to deposit fluid on a portion of the media intended to receive fluid. That is the actuator may fire over negative space on a sheet of media, and not one intended to receive ink to form an image.

In yet another example, a sub-nucleation activation pulse may trigger an actuator evaluation. In this context, a sub-nucleation activation pulse is too narrow to eject fluid, but can be used to sense shorts within an actuator (FIG. 1A, 102).

An evaluation voltage is then altered (block 302). The evaluation voltage may be a reference voltage input to the actuator evaluation device (FIG. 1A, 108) for a particular primitive (FIG. 1A, 110). An output of the actuator sensor (FIG. 1A, 104) shifts the evaluation voltage either up or down. As the output of the actuator sensor (FIG. 1A, 104) is based on the performance of the associated actuator (FIG. 1A, 102), the alteration (block 302) to the evaluation voltage is thereby based on performance of a corresponding actuator (FIG. 1A, 102). Still further, the alteration (block 302) of the evaluation voltage is responsive to the activation of the corresponding actuator (FIG. 1A, 102). That is, an output of the actuator sensor (FIG. 1A, 104) affects the evaluation voltage, only as it is changed by the reception of an activation pulse at the corresponding actuator (FIG. 1A, 102). Accordingly, as described, any alteration (block 302) of the evaluation voltage occurs as an activation pulse is received at the corresponding actuator (FIG. 1A, 102). Thus, an immediate alteration of the evaluation voltage, and thereby an immediate detection and subsequent disablement of the actuator (FIG. 1A, 102), is possible.

Based on a comparison of the altered evaluation voltage and the at least one threshold voltage, the actuator evaluation device (FIG. 1A, 108) detects (block 303) a failure of the corresponding actuator (FIG. 1A, 102). More specifically, the actuator evaluation device (FIG. 1A, 108) detects a failed ejector (FIG. 2B, 220) in an actuator (FIG. 1A, 102). For example, the threshold voltage may be set such that the output of an actuator sensor (FIG. 1A, 104) coupled to an actuator (FIG. 1A, 102) with an ejector (FIG. 2B, 220) operating as expected would be less than a ceiling threshold, greater than a floor threshold, or in between a dual-threshold range. By comparison, an actuator (FIG. 1A, 102) with an ejector (FIG. 2B, 220) that is not operating as expected would cause the output of the corresponding actuator sensor (FIG. 1A, 104) to drive the evaluation voltage greater than a ceiling threshold, lower than a floor threshold, or outside a dual-threshold range.

Based on this detection, the corresponding actuator (FIG. 1A, 102) that has an ejector (FIG. 2B, 220) that has been detected to have failed based on a short between the corresponding ejector (FIG. 2B, 220) and its actuator sensor (FIG. 1A, 104) can be disabled (block 304). That is, it is prevented from immediate and subsequent activations. Doing so ensures that any ill effects of operating a malfunctioning actuator (FIG. 1A, 102) can be avoided. For example, if allowed to continually operate in a malfunctioning state, the malfunctioning actuator (FIG. 1A, 102) could cause other actuators (FIG. 1A, 102) to fail in a cascading fashion.

Disabling (block 304) the actuator (FIG. 1A, 102) can include preventing activation signals originally intended for the actuator (FIG. 1A, 102) from passing to the actuator (FIG. 1A, 102). These activation signals can instead be routed, or forwarded to a different actuator (FIG. 1A, 102). Accordingly, the present actuator (FIG. 1A, 102) is disabled. As described, by preventing the activation signal from reaching the intended actuator (FIG. 1A, 102), the actuator (FIG. 1A, 102) is disabled. By forwarding the activation signal to another actuator (FIG. 1A, 102), the disabled actuator (FIG. 1A, 102) is replaced with a functioning actuator (FIG. 1A, 102).

In some examples, the disablement may be permanent, in other examples it may be resettable. That is in some examples, after an actuator (FIG. 1A, 102) or set of actuators (FIG. 1A, 102) have been disabled, they may be reset such that activation signals intended for those actuators (FIG. 1A, 102) may pass. Such resetting may occur after a predetermined period of time, and allows for a re-testing of particular actuators (FIG. 1A, 102) to see if for whatever reason, the problem may have self-corrected or to account for some actuator (FIG. 1A, 102) service or repair.

Figure 4:
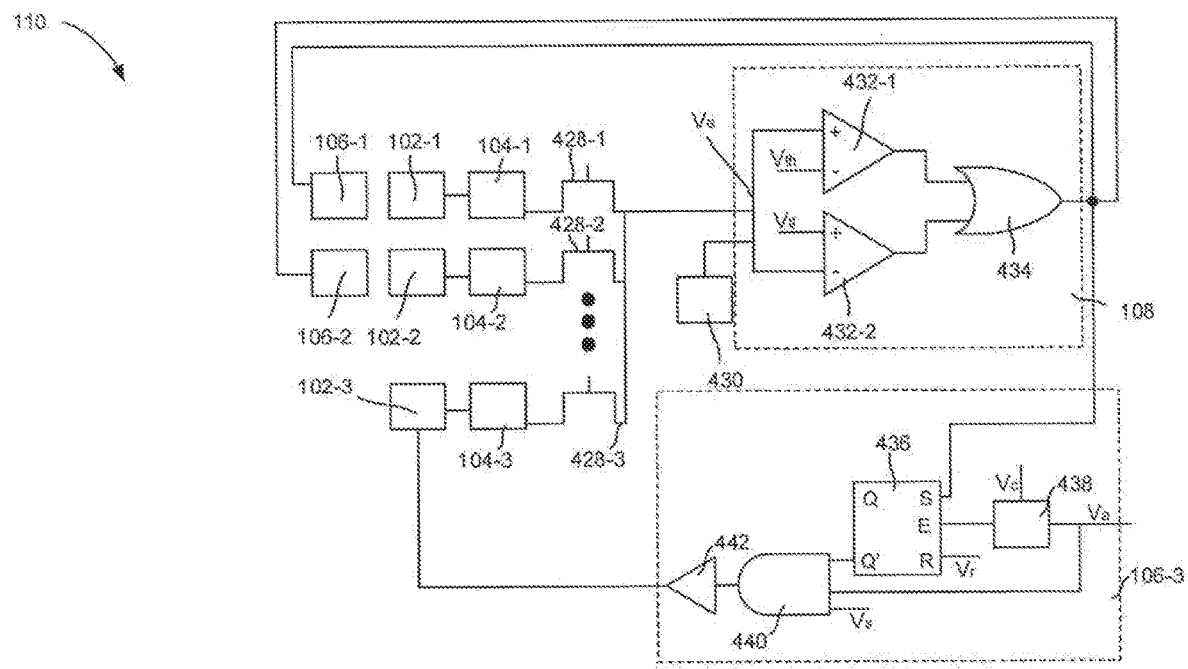
FIG. 4. is a circuit diagram of on-die actuator failure detection components, according to another example of the principles described herein.

FIG. 4, is a circuit diagram of on-die actuator failure detection components, according to another example of the principles described herein. Specifically, FIG. 4 is a circuit diagram of one primitive (110). As described above, the primitive (110) includes a number of actuators (102-1, 102-2, 102-3) and a number of actuator sensors (104-1, 104-2, 104-3) coupled to respective actuators (102). During operation, a particular actuator (102) is selected for activation. While active, the corresponding actuator sensor (104) is coupled to the actuator evaluation device (108) via a selecting transistor (428-1, 428-2, 428-3). That is, the selecting transistor (428) electrically couples the actuator evaluation device (108) and the selected actuator sensor (104). This coupling allows a current to pass through to the corresponding actuator sensor (104) such that a short can be detected between the actuator (102) and the actuator sensor (104). Still further, this selection allows the evaluation voltage, $V_e$, to move up or down, depending on the state (failed or operational) of the corresponding ejector (FIG. 2B, 220).

As described above, a failed ejector (FIG. 2B, 220) of an actuator (102) can be detected based on the impact of the output of an associated actuator sensor (104) on an evaluation voltage. For example, an evaluation voltage, $V_e$, is passed to the actuator evaluation device (108). The output of the actuator sensors (104) are coupled to the transmission line that connects to the actuator evaluation device (108) such that the output voltage of these actuator sensors (104), may draw down the evaluation voltage, $V_e$, or drive it up. This altered evaluation voltage is then compared against at least one threshold voltage. In one particular example, as depicted in FIG. 4, the altered evaluation voltage is compared against two threshold voltages. Accordingly, the actuator evaluation device (108) includes a first comparator (432-1) to determine when the altered evaluation voltage is greater than a high threshold voltage, $V_{th}$. The actuator evaluation device (108) also includes a second comparator (432-2) to determine when the altered evaluation voltage is less than a low threshold voltage, $V_{tl}$. An operation of the dual comparators (432) and the alteration of the evaluation threshold is now provided.

A third actuator (102-3) is activated such that its corresponding ejector (FIG. 2B, 220) is engaged. At the start of firing of an ejector (FIG. 2B, 220), a voltage output, by the corresponding actuator sensor (104-3) is generated. This output voltage, is affected by whether or not there is a short between the ejector (FIG. 2B, 220) of the third actuator (102-3) and the corresponding third actuator sensor (104-3). That is, a failed or malfunctioning ejector (FIG. 2B, 220) will increase or decrease the output voltage, which will correspondingly increase or decrease the evaluation voltage, $V_e$. If the increase places the evaluation voltage above the high voltage threshold, $V_{th}$, or lower than the low voltage threshold, $V_{tl}$, the actuator evaluation device (108) passes, via an OR gate (434), a corresponding output to disable the third actuator (102-3) that has been determined to have failed.

Put another way, the threshold voltages, $V_{th}$ and $V_{tl}$, may be selected such that an evaluation voltage, however it may be altered, that falls within this range is determined to be operating as expected and consequently, should not be disabled. Accordingly, the primitive (110) in some examples includes a maintain device (430) to maintain the evaluation voltage $V_e$, between the high threshold voltage, $V_{th}$, and the low voltage threshold, $V_{tl}$, absent a detected failure. In some examples, this maintain device (430) includes a resistor coupled to a bias voltage that creates the evaluation voltage, $V_e$.

The output of the OR gate (434), which indicates a failed ejector (FIG. 2B, 220) by the evaluation voltage being either driven to be greater than the high threshold voltage, $V_{th}$, or drawn to be lower than the low threshold voltage, $V_{tl}$, is then passed on to a third disabling device (106-3) corresponding to the third actuator (102-3). For simplicity, one disable device (106-3) is illustrated in more detail. However, the other disable devices (106-1, 106-2) may include similar components. Specifically, the disable devices (106) may include a disable storage device (436) that is paired with a corresponding actuator (102) and stores an output of the actuator evaluation device (108). That is, the actuator evaluation device (108) can detect ejector failure for any actuator (102) within the primitive (110), and the disable storage device (436) stores the result of an evaluation of a particular actuator (102).

In some examples, the disable storage device (436) selectively stores the output of the OR gate (434). That is, a signal is received at an "E" input of the disable storage device (436) which selectively allows the disable storage device (436) to store, i.e., latch, the output into the actuator evaluation device (108). In some examples, the latching of the disable storage device (436) is delayed. That is a delay device (438) may receive a pulse to enable the latching of the disable storage device (436), but this signal may be regulated based on a control signal, $V_e$, to the disable storage device. In some examples, the activation pulse, $V_e$, to enable the latching is also used to activate an actuator. That is, the same signal which triggers the third actuator (102-3), also, albeit in a delayed fashion, enables the disable storage device (436) to store an output of the OR gate (434). In some examples, the activation pulse, $V_a$, may be a delayed signal to avoid the negative effects of noise which may be present on the fluid ejection die (FIG. 1A, 100). That is, the activation pulse, $V_a$, may be stored at a previous period of time when noise is less of a factor and then released when called upon. Such a release may be triggered by an output signal of the actuator evaluation device (108).

The disable storage devices (436) may also be resettable. That is, via an input on an "R" input of the disable storage device (436), the disable storage device (436) may be reset to a default value via a reset signal, $V_r$, so as to allow subsequent analysis of a corresponding actuator (102).

The disable device (106) also includes a disable gate (438) to regulate passage of an activation signal, $V_a$, based on an output of the disable storage device (436). That is, the disable gate (438) prevents an activation signal, $V_a$, from passing to the third actuator (102-3) with the failed ejector (FIG. 2B, 220) regardless of an actuator being selected by a select signal, $V_s$.

By comparison, the actuator (102) is enabled, that is, an activation signal, $V_a$, may be allowed to pass through to the third actuator (102-3), when the disable storage device (436) does not indicate that the actuator evaluation device (108) has determined the third actuator (102-3) to be malfunctioning or otherwise inoperable and the third actuator (102-3) has been selected via a select signal, $V_s$.

In some examples, the disable device (218) includes a buffer (442) to condition an output of the disable gate (440). More specifically, the buffer (442) scales the output of the disable gate (440), and isolates the output to generate an activation voltage having the desired characteristics.

In summary, using such a fluid ejection die 1) allows for actuator evaluation circuitry to be disposed on the die itself, as opposed to sending sensed signals to actuator evaluation circuitry off die; 2) increases the efficiency of bandwidth usage between the device and die; 3) reduces computation overhead for the device in which the fluid ejection die is disposed; 4) provides improved resolution times for malfunctioning actuators; 5) allows for actuator evaluation in one primitive while allowing continued operation of actuators in another primitive; and 6) places management of actuators on the fluid ejection die as opposed to on the printer in which the fluid ejection die is installed. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid ejection die comprising:
a number of actuator sensors disposed on the fluid ejection die to:
sense a characteristic of a corresponding actuator; and
alter an evaluation voltage based on a performance of the corresponding actuator,
an actuator evaluation device per primitive to detect a failed actuator based at least in part on a comparison of the altered evaluation voltage and at least one threshold voltage; and
a number of disable devices, wherein each disable device:
is coupled to a respective actuator; and
is to disable a failed actuator.

2. The fluid ejection die of claim 1, wherein the actuator evaluation device:
comprises a first comparator to determine when the altered evaluation voltage is greater than a high threshold voltage;
comprises a second comparator to determine when the altered evaluation is less than a low threshold voltage; and
detects a failed actuator when the altered evaluation is at least one of:
greater than the high threshold voltage; and
less than the low threshold voltage.

3. The fluid ejection die of claim 2, further comprising a maintain device to maintain the evaluation voltage between the high threshold voltage and the low threshold voltage absent a detected failure.

4. The fluid ejection die of claim 1, wherein the disable device comprises a buffer device for conditioning an activation pulse directed to the corresponding actuator.

5. The fluid ejection die of claim 1, wherein the disable device comprises a latch to selectively store an output of the actuator evaluation device.

6. The fluid ejection die of claim 5, further comprising a delay device to delay the storing of the output of the actuator evaluation device at the latch relative to an initial activation pulse.

7. The fluid ejection die of claim 5, wherein the disable device comprises a gate coupled to the latch to:
disable the corresponding actuator when an output of the latch indicates a failed actuator;
enable the actuator when an output of the latch indicates a functioning actuator, the actuator is selected, and the actuator has received an activation pulse.

8. The fluid ejection die of claim 5, wherein an activation pulse for activating an actuator selectively activates the latch to store the output of the activation evaluation device.

9. The fluid ejection die of claim 1, wherein the disable device is a one-time write memory device to permanently disable the corresponding actuator upon a detection that the corresponding actuator has failed.

10. A fluid ejection system comprising:
multiple fluid ejection dies, wherein a fluid ejection die comprises:
a number of actuator sensors to:
sense a characteristic of a corresponding actuator; and
alter an evaluation voltage based on a detected short between the actuator sensor and the corresponding actuator, wherein:
each actuator sensor is coupled to a respective actuator; and
multiple coupled actuator sensors and actuators are grouped as primitives on the fluid ejection die;

an actuator evaluation device per primitive to indicate a short between the actuator sensor and an actuator based at least in part on a comparison of the altered evaluation voltage and at least one threshold voltage; and a number of disable devices, wherein each disable device:
is coupled to a respective actuator; and
is to disable a corresponding actuator when a short between the actuator sensor and the actuator is detected.

11. The fluid ejection system of claim 10, wherein:
each actuator sensor is uniquely paired with an actuator;
each disable device is uniquely paired with an actuator; and
a single actuator evaluation device is shared among all the actuators in the primitive.

12. The fluid ejection system of claim 10, wherein the number of disable devices are resettable disable devices.

13. A method comprising:
receiving an activation pulse for activating an actuator of a primitive on a fluid ejection die;
activating the actuator based on the activation pulse;
altering an evaluation voltage via an actuator sensor, based on a performance of a corresponding actuator, which evaluation voltage is altered responsive to the activation of the corresponding actuator;
detecting a failure of the corresponding actuator based at least in part on a comparison of the altered evaluation voltage against at least one threshold; and
disabling the corresponding actuator when a comparison indicates the corresponding actuator has failed.

14. The method of claim 13, further comprising delaying the disabling of the corresponding actuator a predetermined period of time following the activation of the corresponding actuator based on a time-delayed signal.

15. The method of claim 14, further comprising selectively allowing the activation pulse to selectively activate a latch to store an output of the actuator evaluation device.

* * * * *